Figures 1, 2:
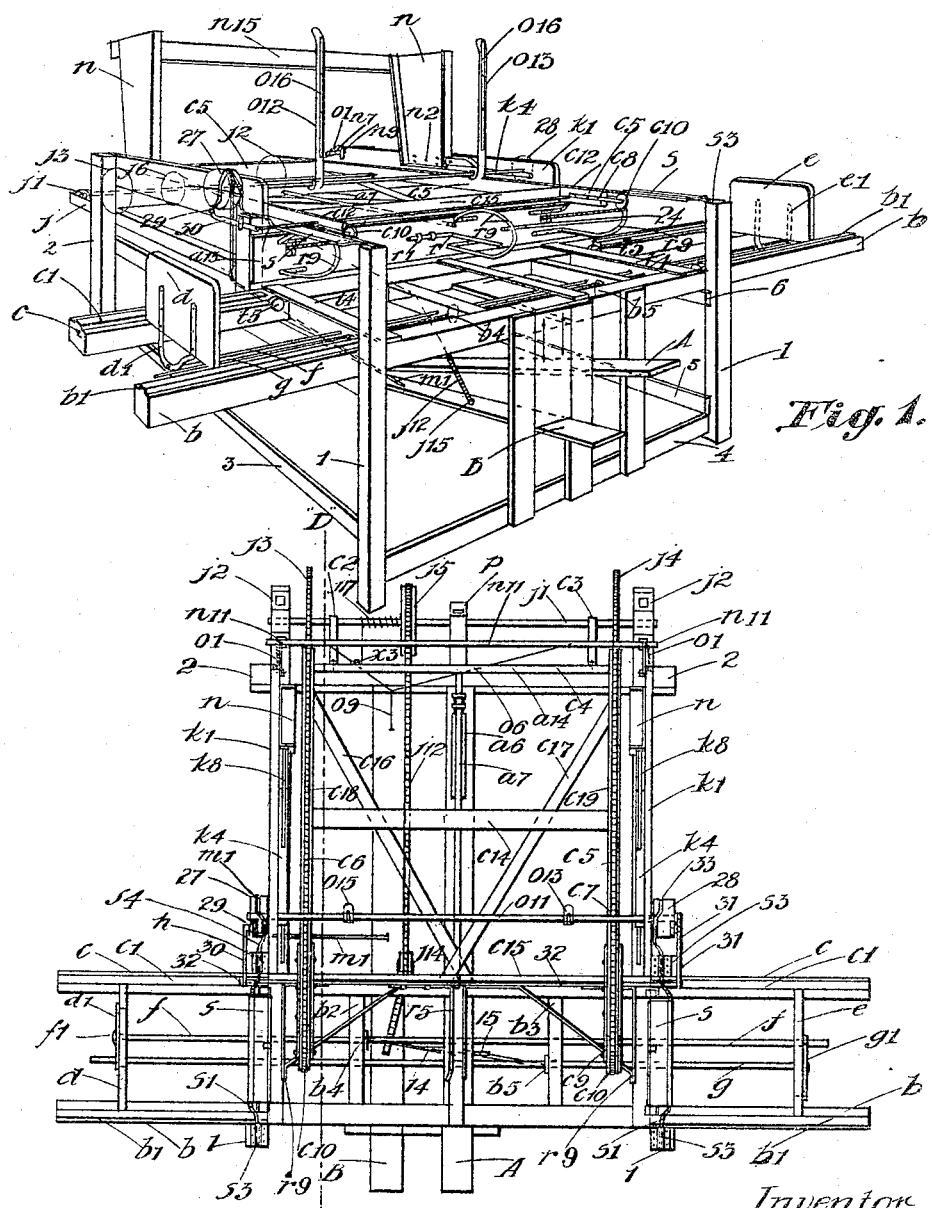

L. H. MORGRIDGE.
BOX MAKING MACHINE.
APPLICATION FILED DEC. 14, 1915.

1,214,814.

Patented Feb. 6, 1917.
4 SHEETS—SHEET 1.

Inventor
Lyman H Morgridge
by E. E. Rodabaugh,
Attorney

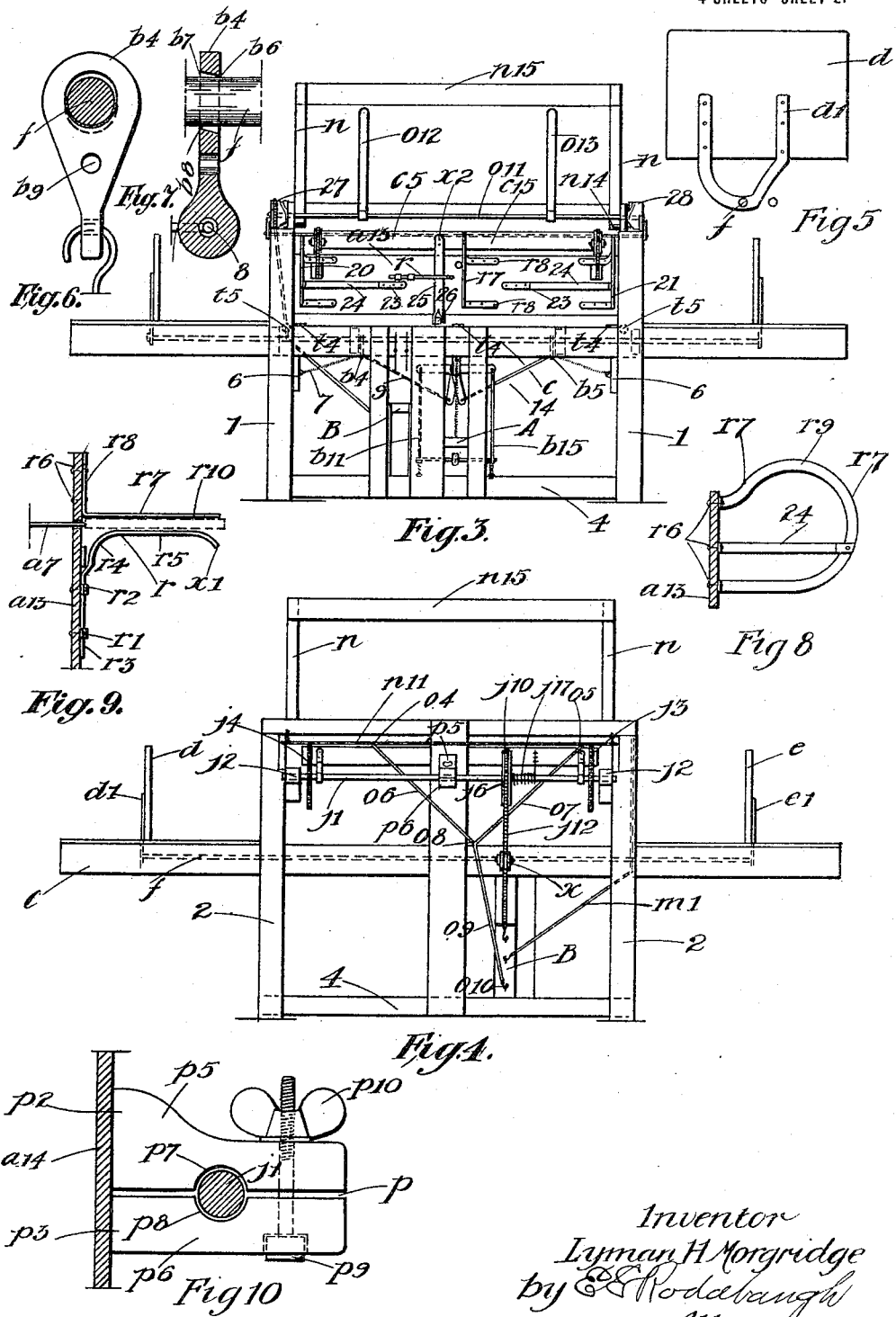

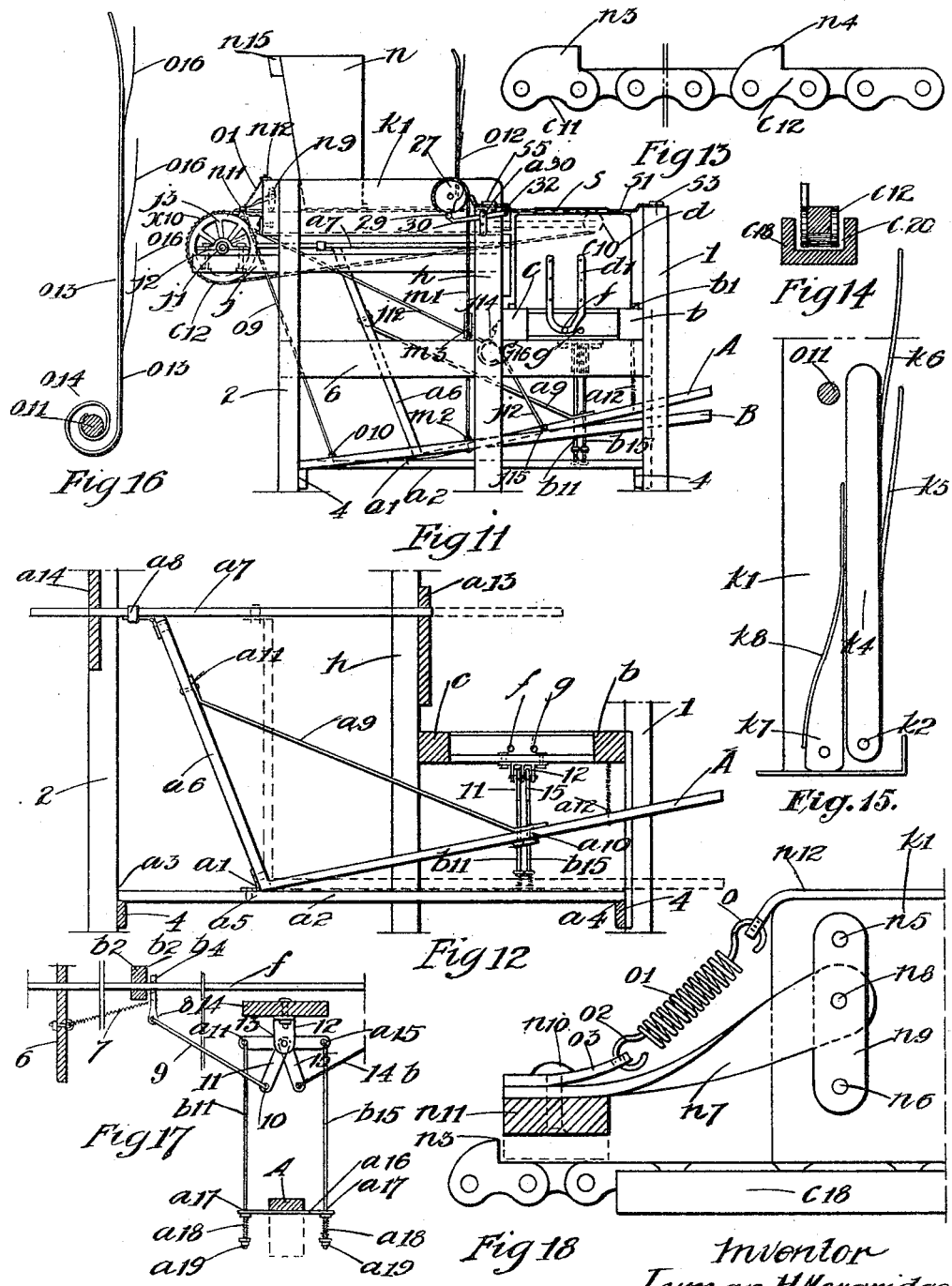

L. H. MORGRIDGE.
BOX MAKING MACHINE.
APPLICATION FILED DEC. 14, 1915.
1,214,814.
Patented Feb. 6, 1917.
4 SHEETS—SHEET 4.
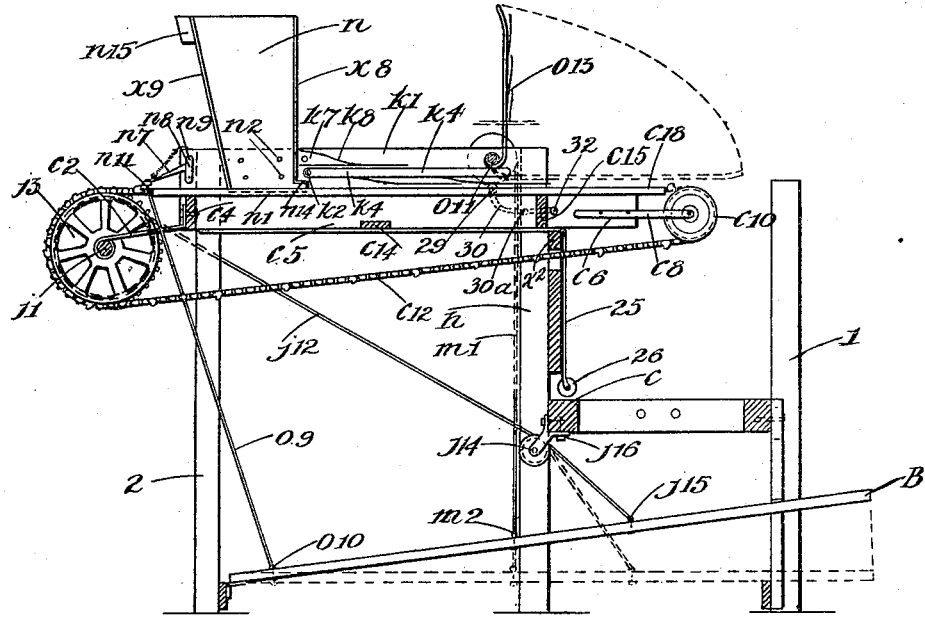
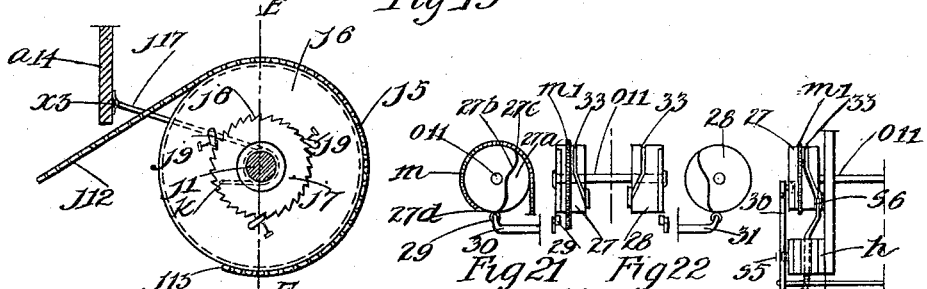
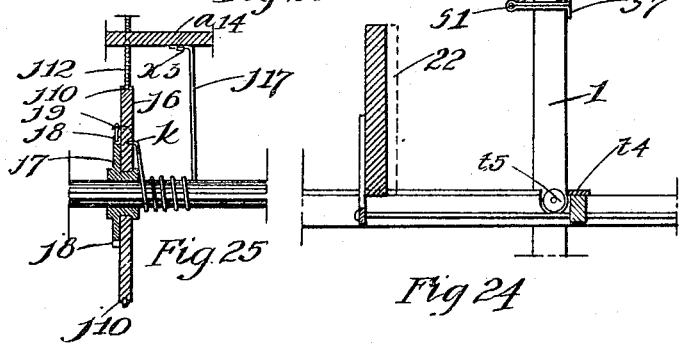
Inventor
Lyman H Morgridge
by E. E. Rodabaugh
Attorney

UNITED STATES PATENT OFFICE.

LYMAN H. MORGRIDGE, OF SAN DIEGO, CALIFORNIA.

BOX-MAKING MACHINE.

1,214,814.　　　　Specification of Letters Patent.　　Patented Feb. 6, 1917.

Application filed December 14, 1915. Serial No. 66,719.

*To all whom it may concern:*

Be it known that I, LYMAN H. MORGRIDGE, a citizen of the United States, residing at San Diego, in the county of San Diego, State of California, have invented a new and useful Box-Making Machine, of which the following is a specification.

My invention relates to improvements in box making machines in which the prepared sides, bottoms and ends of the boxes to be built are placed in quantities in my machine and from their positions so placed are assembled by the use of power applied to certain controlling levers which are in operative connection with the various parts of the box to be constructed; and the objects of my invention are, first, to provide a machine that will place the parts of the box in their proper relative positions when power is applied to the levers; second, that will automatically properly place the parts of the box ready for nailing by the application of force to certain levers; and third, to produce such a machine that is simple, economical of construction, and easily operated. I accomplish these objects by the mechanism illustrated in the accompanying drawings, in which, Figure 1, is a perspective view of my machine; Fig. 2 is a plan view thereof; Fig. 3 is a front elevational view thereof; Fig. 4 is a rear elevational view thereof; Fig. 5 is an end view of the end shook conveyer; Fig. 6 is a detail view of the clamp employed to move the end shook conveyer; Fig. 7 is a similar view taken at right angles to Fig. 6; Fig. 8 is a detail view of the end shook stop; Fig. 9 is a top detail view of the partition shook holder and a part of the support thereof, showing, in dotted lines, a partition shook in place therein; Fig. 10 is a front elevational detail view of a friction brake used on the driving shaft and a cross section of its support; Fig. 11 is a side elevational view illustrating the operation of the levers and their connections; Fig. 12 is a detail view showing the device for throwing out of the machine the finished boxes and the lever mechanism operating the end shook conveyers; Fig. 13 is a detail view of a section of the endless chain for conveying the side and bottom shooks; Fig. 14 is a cross-section of the endless chain and the track in which it travels; Fig. 15 is a front detail view of the springs for holding the side and bottom shooks in position on the endless chain and the member for attaching said springs thereto; Fig. 16 is a detail view of the spring mounted on the cam shaft for holding the shooks in position for nailing; Fig. 17 is a detail view of the means for operating the end shook conveyers, showing in cross-section the supports thereof and the lever operating the same; Fig. 18 is a detail view of the device for locking the endless chains in their proper positions; Fig. 19 is a vertical sectional view of my machine on line C—D in Fig. 2; Fig. 20 is a detail view of the ratchet pulley and its return spring and a section of the pulley driving chain; Fig. 21 comprises a detail side view and a detail front view of the left cam means for holding the end shooks in place; Fig. 22 is a similar view of the right cam; Fig. 23 is a plan detail view of the portion operated by the cam for holding the end shooks in position for nailing; Fig. 24 is a detail end view of the parts shown in Fig. 23 and the end shook conveyer, and a cross-section of the shook support and an end shook in dotted lines, and Fig. 25 is a detail view taken through E—F of Fig. 20.

Similar characters of reference refer to similar parts throughout the views.

The parts or uprights 1 and 2, the sills or cross pieces 3, 4, 5 and 6, constitute the frame work of the machine. On the cross pieces 6 rest the two parallel members $b$ and $c$. The member $b$ is provided at each end on its upper and inner surfaces with a rabbet $b^1$ extending from the end to the inner edges of the uprights 1, and the member $c$ is similarly provided with rabbets $c^1$ which are parallel to and in the same planes with the rabbets $b^1$. These cross pieces $b$ and $c$ support the end shook support members $d$ and $e$, which at their lower corners rest in the rabbets $b^1$ and $c^1$. The member $d$ is securely attached to a U-shaped member $d^1$, and the member $e$ is similarly attached to a similar member $e^1$. The member $d^1$ is securely mounted on the end of the member $f$ at $f^1$, and the member $e^1$ is similarly mounted on the member $g$ at $g^1$. The members $f$ and $g$ are placed parallel to each other and are reciprocally mounted in apertures in the supports $b^2$ and $b^3$ and are adapted to be moved longitudinally therein by means of the clamping member $b^4$. The methods of movement of the members $f$ and $g$ are identical, hence I will only describe the movement of the member $f$.

The clamping member $b^4$ is provided with an aperture $b^6$ which fits on the member $f$. This aperture is cut with angles $b^7$ and $b^8$ on the upper and lower edges, said angles being parallel to each other, and this opening is of a size sufficient to permit the member $f$ to reciprocate therein, and, by reason of the angles $b^7$ and $b^8$, by moving the lower end of the member $b^4$, said member may be made to contact with, or release, the member $f$. The member $b^4$ at $b^9$ has attached thereto a coil spring 7, which is attached at its other end to the member 6 and is adapted, when contracted, to draw the member $b^4$ to a vertical position against the member $b^2$, thereby leaving the member $f$ free to reciprocate therein.

Attached to the lower end of the member $b^4$ at 8 is a connecting rod 9 which is attached to the one end 10 of the bell crank member 11. The said bell crank member 11 is pivotally mounted at its middle in the member 12 on the pivot member 13, Figs. 12 and 17. The member 12 is securely mounted on a support 14 which is securely bolted to the members $b$ and $c$. A similar bell crank 15 is also pivotally mounted on the member 13, having its extended ends in the opposite position from the member 11, and its operation is similar to the operation of bell crank 11, only in the opposite direction, and the connecting rod $14^b$ thereof connects with a clamp member similar to clamp member $b^4$ and operates in identically the same manner as $b^4$ for moving the member $g$ in the opposite direction to the movement of the member $f$ above described.

Pivotally attached at its one end to the extended end $a^{11}$ of the bell crank 11 is a connecting rod $b^{11}$, and similarly attached to the extended end $a^{15}$ of the bell crank 15 is a similar connecting rod $b^{15}$. The rods $b^{11}$ and $b^{15}$ are respectively reciprocally mounted at their lower ends in the plate $a^{16}$ at $a^{17}$. Mounted on the lower ends of $b^{11}$ and $b^{15}$, below the member $a^{16}$ are coil springs $a^{18}$ which are respectively supported on rods $b^{11}$ and $b^{15}$ by adjustable nuts $a^{19}$. These springs $a^{18}$ act as shock absorbers and facilitate the action of the rods $b^{11}$ and $b^{15}$. The lever A, when pressed down by the application of power on the extended end thereof, forces the rods $b^{11}$ and $b^{15}$ downward, carrying with them the ends $a^{11}$ and $a^{15}$ of the bell cranks 11 and 15. The operation of said bell cranks being identical but opposite in their effects on the members $f$ and $g$, I have only illustrated the operation of the bell crank 11.

When the rod $b^{11}$ is forced down, the end of the bell crank, 10, is thrown toward a vertical position on the pivot 13 and draws the end 8 of the member $b^4$ with it, thereby causing the beveled edges $b^7$ and $b^8$ to clamp on the member $f$, thereby forcing the member $f$ through the supports $b^2$ and $b^3$, carrying with it the end shooks mounted against the end shook holder $d$ on the member $f$, and when the pressure is removed from the lever A, the spring 7 draws the member $b^4$ back to its vertical position against the support $b^2$.

The pedal or lever A is attached by a hinge joint $a^1$ to the support $a^2$ at $a^5$, (Figs. 11 and 12) which support is mounted at its ends on the members 4 at $a^3$ and $a^4$. The lever A is provided with an arm $a^6$ placed at a sufficient angle to said lever A to be in operative connection with the kick-out member $a^7$, and is hinged thereto at $a^8$. The brace $a^9$ is rigidly attached at its one end to the lever A at $a^{10}$ and to the arm $a^6$ at $a^{11}$. A coil spring $a^{12}$ is attached at its one end to the lever A and at its other end to the support member $b$. The member $a^7$ is reciprocally mounted in the supports $a^{13}$ and $a^{14}$, and the support $a^{14}$ is mounted on the uprights 2, and the support $a^{13}$ is mounted on the uprights $h$.

The horizontal supports $j$ are two in number, and each is rigidly mounted near its one end on the upright 2 and at its other end on the upright $h$, and mounted on the portions of said members $j$ extending beyond the supports 2 is a main driving shaft $j^1$ in the shaft box $j^2$ which is securely bolted to said members $j$. Rigidly mounted on said shaft $j^1$ are two sprocket wheels $j^3$ and $j^4$, and there is also mounted on said shaft $j^1$ a ratchet pulley $j^5$. This pulley $j^5$ is composed of two members, $j^6$ and $j^7$. The member $j^7$ is rigidly mounted on the shaft $j^1$ and is provided on its perimeter with teeth or lugs $j^8$. The member $j^6$ is provided near its inner edge with a plurality of spring pawls $j^9$ which are adapted to engage with the lugs $j^8$ on member $j^7$ when the member $j^6$ is revolved in the one direction and adapted to move freely in the other direction without engaging with said member $j^7$. The member $j^6$ is provided on its perimeter with a groove $j^{10}$, and mounted in the groove $j^{10}$ is a drive chain $j^{12}$, which is securely fastened at its one end at $j^{13}$ to the member $j^6$, and, passing through the groove $j^{10}$ and over the pulley $j^{14}$, is securely attached to the lever B at $j^{15}$.

The pulley $j^{14}$ is mounted rigidly on the member $c$ at $j^{16}$. Mounted on the shaft $j^1$ between the ratchet pulley $j^5$ and the sprocket $j^3$ is a coil spring $j^{17}$. This spring $j^{17}$ is attached at its one end to the member $j^6$ at $k$ and at its other end to the support $a^{14}$ at $x^3$. The spring $j^{17}$ is adapted to force back the member $j^6$ to its starting point when the force on lever B is released.

Attached to support $a^{14}$ by screws or bolts $p^2$ and $p^3$ is the friction member $p$, (Fig. 10) composed of two members $p^5$ and $p^6$. The member $p^5$ is provided on its lower edge with a semi-circular opening $p^7$, and the member $p^6$ is provided on its upper edge, adjacent to the semi-circular opening in $p^5$, with a similar opening $p^8$. The circular opening formed by placing together members $p^5$ and $p^6$, as shown best in Fig. 10, provides an aperture sufficiently large to contain the shaft $j^1$. The members $p^5$ and $p^6$ are placed so that there is a sufficient space left between the two adjacent surfaces thereof to permit of the extended ends of said members $p^5$ and $p^6$ being drawn together by means of a bolt $p^9$ being inserted through the said ends adapted to be tightened or loosened by the screwing or unscrewing of the thumb-bolt $p^{10}$. The friction member $p$ is adapted to act as a friction brake on the shaft $j^1$ to prevent it from revolving backwardly when the pressure is released on the lever B.

Pivotally mounted on the shaft $j^1$ at their ends adjacent to the sprockets $j^3$ and $j^4$ are the supports $c^2$ and $c^3$, which at their other ends are rigidly attached to the member $c^4$ of the carriage $c^5$. Mounted on the ends of the members $c^6$ and $c^7$ are the support members $c^8$ and $c^9$, and pivotally mounted in the extended ends of each of said members $c^8$ and $c^9$ is a grooved pulley $c^{10}$. The sprocket wheels $j^3$ and $j^4$ are identical in structure, and each is provided on its perimeter with teeth or lugs $x^{10}$ adapted to fit into links $c^{11}$ of the endless chains $c^{12}$, shown best in Fig. 13. The chain $c^{12}$ is adapted to be placed in the groove of the pulley $c^{10}$ and over and in connection with the sprocket wheel $j^3$. As the sprockets, pulleys and endless chains are alike on both sides of my machine, I have only described the one illustrated in the right side thereof. The members $c^6$ and $c^7$ of the carriage $c^5$ are further supported by the cross pieces $c^{14}$ and $c^{15}$, to which they are rigidly attached, and by the braces $c^{16}$ and $c^{17}$.

Mounted on the top of the carriage $c^5$, one on the member $c^6$ and the other on the member $c^7$, are two chain track members $c^{18}$ and $c^{19}$. Each of said members $c^{18}$ and $c^{19}$ is provided with a longitudinal rectangular channel $c^{20}$, shaped as shown best in Fig. 14, of a sufficient size to allow the base of the endless chain $c^{12}$ to reciprocate freely therein. These members $c^{18}$ and $c^{19}$ are placed in a horizontal position parallel with each other and the upper edge of each is in line with the surface of the sprocket $j^3$ and the pulley $c^{10}$, so that the endless chain $c^{12}$ passes freely over said sprocket $j^3$ and pulley $c^{10}$ while traveling through the channel $c^{20}$ in said members $c^{18}$ and $c^{19}$.

Mounted on the upper extended ends of the uprights 2 and $h$, on each side of the machine, is a support member $k^1$, and pivotally mounted on said member $k^1$ at a point $k^2$ is a support member $k^4$ having its extended end unattached. Mounted on the lower side of said support member $k^4$, one in advance of and slightly overlapped by the other, are two flat curved springs $k^5$ and $k^6$. Rigidly mounted on said support $k^1$ immediately above and adjacent to the member $k^4$ is another spring support member $k^7$ which is tapered from its upper edge to its lower edge near the middle of the support $k^4$, and is provided on said tapering edge with a flat spring member $k^8$ rigidly attached to said tapering edge and having an extended portion thereof extending beyond the support $k^7$ and bent down and resting on the member $k^4$, the purpose of which is to give added pressure to the springs $k^5$ and $k^6$. The springs $k^5$ and $k^6$ are adapted to rest upon and hold in position the side and bottom box shooks on the endless chain conveyers $c^{12}$. Also mounted on the members $k^1$, immediately to the rear of each of the members $k^4$ and adjacent thereto is a side and bottom shook holder $n$, the lower end of which is provided with an inwardly turned flange $n^1$ on which the ends of the side and bottom shooks rest.

The shook holders $n$ are attached rigidly to the supports $k^1$ by means of bolts or screws $n^2$. The lower edge of the member $n$ is placed on a level with the upper surface of the body of the endless chains $c^{12}$ so that the lugs $n^3$ and $n^4$ will extend upward in the bottom of the member $n$ sufficiently to engage with the edge of the bottom shook when the endless chain is moved along on the sprockets $j^3$ and the pulleys $c^{10}$. Two shook holders $n$ are provided each having two flanges $x^8$ and $x^9$ of a sufficient width to prevent the shooks from falling therefrom, and are each provided at the bottom on the front edge with a passage-way $n^{14}$ which is adapted for permitting the bottom shook to pass out of the holder $n$ when the lugs $n^3$ or $n^4$ are forced against the bottom shook in the holder $n$. Mounted on the rear of the shook holders $n$, at the top edge thereof, is a support $n^{15}$. This support $n^{15}$ is attached rigidly to the holders $n$ and is adapted to hold them in their relative positions to each other.

On the inside of the rear end of each of the supports $k^1$ is rigidly mounted at $n^5$ and $n^6$ a plate $n^9$ (Fig. 18) on which is pivotally mounted an arm $n^7$ at one end on a pivot $n^8$. The two arms $n^7$ are attached at their extended ends, by means of bolts $n^{10}$, to the brake member $n^{11}$. The brake member $n^{11}$ is adapted to be raised and lowered by the swinging of the arms $n^7$ on the pivots $n^8$.

Mounted on each of the rear ends on the upper edges of the members $k^1$ is a spring support member $n^{12}$ to which is attached, by means of the hook $o$, the one end of the coil spring $o^1$. The other end of the spring $o^1$ is attached by means of the hook $o^2$ to the spring support $o^3$, which is rigidly attached to the member $n^{11}$ by means of the bolts $n^{10}$.

Attached to the brake member $n^{11}$ at $o^4$ and $o^5$ (Figs. 4 and 11) are two cables $o^6$ and $o^7$, which converge at $o^8$ and are connected to the cable $o^9$, which is attached to the lever B at its other end at $o^{10}$. The cable $o^9$ is of sufficient length so that, when the lever B is pressed down by the application of force thereon, the brake member $n^{11}$ will be forced down into the dotted position shown in Fig. 18, so that the rear edge of said brake member $n^{11}$ will contact with the lugs $n^3$ or $n^4$ of the endless chains $c^{12}$, thereby causing the movement of said chains to cease until the pressure on lever B is released, and when the pressure on said lever B is released the springs $o^1$ will force the member $n^{11}$ out of engagement with said lugs $n^3$ or $n^4$. The lugs $n^3$ and $n^4$ are placed at intervals in the endless chain $c^{12}$ to suit the width of the shooks used in the construction of the boxes.

A shaft $o^{11}$ (Figs. 3, 11, 16 and 19) is pivotally mounted at each end in one of the supports $k^1$, near the front end thereof, and adjacent to the extended end of the spring member $k^4$, and disposed on said shaft $o^{11}$ are two spring members $o^{12}$ and $o^{13}$. These members $o^{12}$ and $o^{13}$ are identical in shape and size, and are attached rigidly at one end to the shaft $o^{11}$ and provided with a portion $o^{14}$ coiled about said shaft $o^{11}$, and a straight extended portion $o^{15}$ having a plurality of curved spring members $o^{16}$ mounted on the lower surface when said spring $o^{12}$ is in its position where it is in contact with the shooks on the endless chain $c^{12}$.

Mounted in the middle of the support $a^{13}$, by means of bolts $r^1$ and $r^2$, is a partition shook holder $r$ (Figs. 1, 2 and 9). This member $r$ is provided with a straight portion $r^3$ to facilitate its attachment to the member $a^{13}$, and extending therefrom is a curved portion $r^4$ bent so as to cause another straight portion $r^5$ to extend at right angles to the member $a^{13}$ and parallel with and adjacent to, on its inner surface, with the surface of the member $a^7$ when said member $a^7$ is projected through the opening in $a^{13}$, and said portion $r^5$ terminates at its extremity with a curved end $x^1$. There is also mounted in said member $a^{13}$, by proper bolts $r^6$, another member $r^7$. This member $r^7$ is U-shaped, as shown best in Fig. 8, and is provided on each end with straight portions $r^8$ to facilitate its attachment to the support $a^{13}$, and has an extended bow portion $r^9$ bent at right angles to $r^8$ and extending as far from the member $a^{13}$ as the member $r$ extends therefrom and leaving a sufficient space between the parallel portions of the members $r$ and $r^7$ to permit of the insertion of a box partition $r^{10}$ between the two portions $r^5$ and $r^7$, so that the same will be held therein by the friction of the said two parallel parts $r^5$ and $r^7$ and allow the said shook to be forced therefrom by the reciprocation of the kick-out $a^7$ in the support $a^{13}$. Also mounted on said support $a^{13}$, one at each end thereof, are two stop members 20 and 21 similar in form and structure to the member $r^7$. The member 20 faces in the same direction as the member $r^7$, while the member 21 is reversed in its position and is attached to the support $a^{13}$ in the same manner as $r^7$. The distance between the extending portions of the members 20 and 21 equals the inside length of the box to be constructed, and the said members 20 and 21 act as stops for the end box shooks 22.

The members 20 and 21 are each provided with a long brace member 24, which is attached at one end to the bow portion $r^9$ and at the other end firmly mounted in $a^{13}$ at 23. The members 24 are of a sufficient strength to prevent the portion $r^9$ from being forced out of position by coming in contact with the box end shooks 22.

Mounted on the supports $b$ and $c$ are three anvil iron supports $t^1$, $t^2$ and $t^3$. Mounted in each of the members $b$ and $c$ are four casters $t^5$. These casters $t^5$ are similar in size and shape and are adapted to facilitate the moving of the end shooks on to the anvil irons $t^4$. It will be noticed that they are placed on said supports $b$ and $c$ adjacent to the said anvil irons $t^4$ so that, when the end shooks 22 are forced toward the supports 20 and 21 by the action of the end shook carriers $d$ and $e$, the casters $t^5$ will prevent the lower edges of the shooks 22 from catching on to the edges of the anvil irons $t^4$ when moved over them against the supports 20 and 21.

Slightly pivotally mounted on the member $c^{15}$ near the middle thereof at its upper end at $x^2$ is a member 25. This member is provided on its lower end with a small wheel 26. The member 25 is of a sufficient length so that the wheel 26 may almost rest on the upper surface of the member $c$. The wheel portion 26 is so placed that when the side of the box has been nailed to the end and middle shooks and the box turned over so that the nailed portion rests on the surface of the member $c$, the side portion resting on said member $c$ may be forced under said wheel 26, thereby raising with the member 25, the end of the carriage $c^5$, thus causing one end of the carriage $c^5$ to turn on the point $j^1$ raising the other end of said carriage to the proper height to permit of the side shooks clearing the end and partition shooks and be moved out to the proper position for nailing on the said side and bottom shooks. Rigidly mounted on said shaft $o^{11}$ on each end thereof, adjacent to the supports $k^1$, are two pulleys 27 and 28 which are respectively left and right in their operation. These pulleys are best shown in Figs. 21 and 22. On the side of pulley 27, facing away from the machine, is a recess $27^a$ extending from the circumference of said pulley toward the center thereof, the bottom of which said recess is provided with a face $27^b$ consisting of a compoundly curved face having each end thereof uniting with the outer perimeter of said pulley at intersections $27^c$ and $27^d$. The surface formed by the line $27^d$ in connection with the surface of the pulley 27, from $27^c$ to $27^d$, provides a cam pathway for the passage of the wheel 29, which is mounted on the arm 30. The arm 30 is pivotally mounted at $30^a$ near its middle near the top of support $h$ so that said wheel 29 is in engagement with the pulley 27, allowing said arm 30 to remain in a practically horizontal position.

The pulley 28 is provided on its outer surface with the same character of a recess described in pulley 27 and is provided with a member similar to 29 adapted to similarly travel therein and similarly connected to an arm similar to 30 hereinbefore described and herein designated as arm 31.

The arms 30 and 31 are connected by a rod 32 which carries the front end of the carriage $c^5$. The pulleys 27 and 28 are rigidly mounted on the shaft $o^{11}$ so that their cam faces are in the same plane and coincide. When the shaft $o^{11}$ is turned, carrying said pulleys 27 and 28 with it, the members 29 will travel over the path made by the cam recesses in each of said pulleys 27 and 28, thereby causing the end of the members 30 and 31, at the wheel 29, to be forced downward from the center of said pulley thereby causing the extended ends of the arms 30 and 31 to move upward carrying with them the front end of the carriage $c^5$, which is supported by said member 32 to a sufficient height to allow a shook to be inserted between the wheel 26 and the top of the member $c$, thus allowing the wheel 26 on the member 25 to rest on the inside surface of a side shook when a side shook occupies the space on said member $c$.

The pulleys 27 and 28 are each provided on the face thereof with a groove 33. This groove, in the case of pulley 27, is located to the side of the middle of said pulley toward pulley 28, and in pulley 28 it is located similarly toward pulley 27. This groove 33 starts on the inner edge of the surface of said pulley and travels obliquely toward the center of same, for a distance, and then pursues its course parallel to the sides of said pulley to approximately one-half the circumference thereof.

Mounted at their one ends on the tops of the uprights $h$ and at their other ends on the tops of the uprights 1, are two end shook holders $s$. These shook holders $s$ are similar in structure and action and operate right and left to each other. The shook holder $s$ is pivotally mounted on its outer edge on a crank shaft $s^1$, the extended end $s^2$ of which is pivotally mounted in the member $s^3$ on upright 1, and the other end, $s^4$, is similarly mounted in the member $s^5$ on the top of the upright $h$. The portion $s^4$ extends through the support $s^5$ and is bent slightly at an angle so that the end $s^6$ thereof rests in the groove 33 in the pulley 27 or pulley 28.

On the inner edge of the holder $s$ is provided a flange $s^7$ extending the entire length thereof, and it is adapted to rest against the upper edge of the end shook 22 and hold said end shook 22 firmly against the stops 20 and 21 while the side and bottom shooks are being nailed to the end shooks 22. The inner edge of the holder $s$, adjacent to the flange $s^7$, is supported on a rod $s^8$, which is mounted at its ends on the supports $h$ and 1. The holder $s$ is provided near the middle with a support $s^9$ which is provided with an extending portion $x^4$, which rests on the rod $s^8$, and this portion $x^4$ is of a sufficient length to support the holder 7 and slide back and forth freely across the rod 8 when the crank shaft $s^1$ is rotated.

Attached to the pulley 27 at its one end, on the face thereof, at $m$ is a cable $m^1$. This cable $m^1$ passes over pulley $m^3$ (Fig. 11) and extends to the lever B and is attached thereto at its other end at $m^2$, and is of a sufficient length to allow the chain $c^{12}$ to move forward sufficiently to allow the lugs $n^3$ or $n^4$ to pass the brake member $n^{11}$ when the lever B is pressed downward, and said cable $o^9$ acts on said brake member $n^{11}$. When the lever B is in its released or up position, pulleys 27 and 28 take the position shown best in Fig. 2, and the ends $s^6$ of the crank shafts $s^1$, in position in the groove 33, near the center of the pulleys 27 and 28, permit the portion of $s$ supported on $s^1$ to be at its lowest position, and the other edge, having the flange $s^7$ thereon, will be in its highest position on account of its resting on the support $s^8$ at $s^9$, and thereby permits the end shook 22 to pass by the flange $s^7$ against the stops 20 and 21. When the lever B is pressed fully down, the cable $m^1$, being drawn over the pulley 27, causes the shaft $o^{11}$ to revolve, carrying with it the pulleys 27 and 28. The portion $s^6$ of the crank shaft $s^1$ will travel through the groove 33 in the pulleys 27 and 28 and be carried toward the center of the pulleys 27 and 28, thereby causing the crank shaft $s^1$ to revolve, thereby lowering the outer edge of $s$ supported on said crank shaft $s^1$, and causing the inner portion containing the flange $s^7$ to be thrown downward and against the upper edge of the shooks 22, thereby pressing said shooks 22 firmly against the stops 20 and 21 until released by the removal of the force on the lever B when the action of the spring $j^{17}$ will cause the pulleys 27 and 28 to return to their original positions.

In operation, any number of side and bottom shooks desired are placed in the shook holders $n$, one upon the other, the bottom one resting on the endless chains $c^{12}$. A number of end shooks are placed on edge resting against the supports $d$ and $e$. The lever A being moved downward and upward by the operator, by the action of the bell cranks 11 and 15, causes the members $f$ and $g$ to be moved so that they carry the end shooks up to and against the stops 20 and 21. The operator inserts a partition shook between the portions $r^5$ and $r^7$. The lever B is then pressed downward, thereby causing the tightening of the cable $m^1$ and chain $j^{12}$, immediately followed by the tightening of the cable $o^9$. The tightening of the cable $m^1$ causes the shaft $o^{11}$ to revolve, causing the springs $o^{12}$, $o^{13}$ to be thrown forward and pressed down on the shooks on the carriage $c^5$. The full sweep of the lever B is sufficient to move the chains $c^{12}$ on the carriage $c^5$ a distance equal to the width of the side or bottom shook and the space between said shooks, thus requiring in the ordinary apple box two sweeps of the lever B to place the shooks necessary for one side of a box. After the release of the lever B the brake $n^{11}$ is drawn out of engagement with the lugs $n^3$ or $n^4$ by the action of the spring $o^1$. When the two side shooks have been nailed to the end shooks 22 and the lever B is released, the lever A is then depressed and the kick-out $a^7$ forces the partition $r^{10}$ out of the shook holder $r$, and $r^{10}$ is turned over by the operator and immediately forced back into $r$ in position to have the bottom shooks nailed thereon, and the bottom shooks are brought into position by the same process of operation as that employed for the side shooks. After one side and the bottom shooks are nailed on and the partly constructed box is turned in position to place the second side in position, the wheel 26, owing to the action of the cams on pulleys 27 and 28, will be raised sufficiently above the support $c$ to permit the side shooks to be inserted between the wheel 26 and the top of the support $c$, and the carriage $c^5$ will be raised to a height equal to the thickness of the said shook between the wheel 26 and the support $c$, thereby allowing the shooks resting on the chains $c^{12}$ on the carriage $c^5$ to pass above the upper edges of the ends and partition shooks of the box being constructed. It will be noticed that the lever B is held down firmly while the side and bottom shooks are being nailed to the end of the partition shooks.

What I claim as new, and desire to secure by Letters Patent, is:

1. The combination, in a box making machine of a pair of parallel, slidably mounted horizontal members, an end shook holder provided with a shook support mounted on the end of each of said horizontal members for moving the end shooks into position for fastening the side and bottom shooks thereto, a clamping means mounted on each of said horizontal members and attached to the frame of said machine, and a lever means mounted in said machine in operative connection with both of said clamping means to cause the latter to move the horizontal members in one direction.

2. The combination, in a box making machine, of a side and bottom shook carriage having a main driving shaft at its rear end, a cam actuated support member having the front end of said shook carriage pivotally mounted thereon, two sprocket wheels rigidly mounted on said main driving shaft, one near each end thereof, pulleys mounted on the other end of said carriage one opposite to each of said sprocket wheels, a channeled track mounted on said carriage between each of said sprocket wheels and its respective pulley, two endless sprocket chains, one on each of said sprocket wheels and its respective pulley and resting in one of said channeled tracks, a two-member ratchet pulley provided with a groove in its perimeter mounted on said main driving shaft between said sprocket wheels, rigidly attached thereto by its inner member, a spring means mounted on said main shaft adjacent to said ratchet pulley and attached to said carriage at its one end and to the outer member of said ratchet pulley at its other end, a pressure spring means for holding the side and bottom shooks firmly on said sprocket chains rigidly mounted on said cam actuated support member, a drive chain attached at its one end to the outer edge of said ratchet pulley in said groove in the perimeter thereof, and a lever operatively connected to the other end of said drive chain for causing the operation of said sprocket chains in said shook carriage.

3. The combination, in a box making machine, with a cam actuated shook carriage and its support, of a plurality of cam members for operating said carriage and rigidly mounted on said carriage support, each comprising a pulley having integral therewith on one side a cam portion provided with a compoundly curved pathway and, on its surface and commencing on the side opposite said cam portion, a groove running at an angle diagonally toward the middle of the surface of said pulley and continuing along near the middle of it parallel to the side thereof for a portion of the circumference thereof.

4. The combination, in a box making machine, of right and left end shook holders, each comprising a crank shaft member pivotally mounted at its ends on two support portions on the frame of said machine, having one end extended beyond its support and turned at an angle thereto, an operating means in operative connection with each of said crank shaft members, a flat member provided with a flange along one side and pivotally mounted on said crank shaft member on the side opposite to said flange and between said two support portions, and a support member mounted at each end on the said supports on which said crank shaft is mounted and extending parallel to the above said flanged side of said flat member and pivotally attached to said flat member near its middle.

5. The combination, in a box making machine, of yielding means for holding side and bottom shooks on the conveying chain mounted on the carriage of said machine, comprising a spring support member pivotally mounted at one end, a plurality of curved spring members mounted at one end on the side of said support member adjacent to said shook conveying chain and extending downwardly from said support member toward the conveying chain, another spring support member rigidly mounted above and adjacent to said pivotally mounted support member and provided with a downwardly slanting surface, and a spring pressure member mounted on said downwardly slanting surface and having its extending portion resting upon the top of said pivotally mounted support member.

6. The combination, in a box making machine, of a plurality of shook carrier propelling devices mounted in said machine, comprising a plurality of bell crank members pivotally mounted at their angles on a common pivot, a clamping member mounted on each of said shook carrier propelling devices, a plurality of connecting rods, each connecting the lower end of one of said bell crank members with one of said clamping members, a plurality of other connecting rods extending, one from each of the other ends of said bell cranks, a lever in operative connection with said bell-cranks through the last mentioned connecting rods, a cross-piece mounted at each end of one of said last named connecting rods below said lever, a plurality of coil springs mounted one on each of said connecting rods below said cross-piece, and an adjusting means mounted on the end of each of said connecting rods below said coil springs.

7. The combination in a box making machine, of an endless chain stop member comprising a plurality of arm members pivotally mounted one on each side of said machine, a stop member mounted on the extended ends of said arm members, a plurality of spring support members mounted one on each side of said machine adjacent to said arm members, a plurality of other spring supports mounted one on each end of said stop member, a plurality of springs mounted one in each of said first named support members and one of said last named support members, a cable attached at its one end to said stop member, and a lever attached to said cable at its other end to cause the operation of said stop member.

8. In a box making machine, a frame, a main driving shaft mounted in the rear of said machine on said frame, a side and bottom shook carriage pivotally mounted at its rear end on said main driving shaft, a cam operated shaft mounted on the front end of said side and bottom shook carriage, a plurality of end shook carriers mounted on horizontal supports on the forward end of said machine, a plurality of stops for holding the end shooks, a clamp stop means mounted on said frame for holding a partition shook in position, cam operated means mounted on said frame for holding said end shooks in position against said end shook stops, a reciprocating ejector means for ejecting the partition shooks, a clamping propelling means connected to each of said end shook carriers, a lever means in operative connection with said end shook carriers and said ejector means, a side and bottom shook holder mounted on said machine, a plurality of endless conveyer chains mounted on said shook carriage in operative connection with said side and bottom shook holder, a cable connected with said main shaft to cause the rotation thereof, another cable connected with said cam operated shaft to cause the rotation thereof, a conveyer chain stop mounted on said machine in operative connection with said conveyer chains, a cable mounted on said chain stop, and a lever means connected with said cables to cause the operation of said main driving shaft, said cam operated shaft and said conveyer chain stop.

In testimony whereof, I have hereunto subscribed my name in the presence of two subscribing witnesses.

LYMAN H. MORGRIDGE.

Witnesses:
MINNIE KORTE,
E. E. RODABAUGH.